United States Patent [19]

Davison et al.

[11] Patent Number: 5,670,048
[45] Date of Patent: Sep. 23, 1997

[54] PREPARATORY SUPERCRITICAL FLUID EXTRACTION USING SEALED CHAMBER

[75] Inventors: Dale Alan Davison, Greenwood; Henry LeRoy Walters, Lincoln, both of Nebr.

[73] Assignee: Isco, Inc., Lincoln, Nebr.

[21] Appl. No.: 601,378

[22] Filed: Feb. 14, 1996

Related U.S. Application Data

[63] Continuation of Ser. No. 182,772, Jan. 18, 1994, abandoned.

[51] Int. Cl.⁶ ............... B01D 11/00; B65D 53/00
[52] U.S. Cl. ............... 210/634; 210/511; 96/106; 220/239; 220/240; 220/581; 422/102
[58] Field of Search ............... 210/198.2, 511, 210/634, 655, 656; 96/101, 106; 422/69, 70, 102, 103; 436/161, 178; 95/82; 220/200, 202, 203, 234, 240, 239, 581, 582; 277/27, 165

[56] References Cited

U.S. PATENT DOCUMENTS

| | | | |
|---|---|---|---|
| 3,419,180 | 12/1968 | Homrig et al. | 220/239 |
| 4,283,280 | 8/1981 | Brownlee | 210/198.2 |
| 4,313,828 | 2/1982 | Brownlee | 210/198.2 |
| 4,451,363 | 5/1984 | Brownlee et al. | 210/198.2 |
| 4,861,473 | 8/1989 | Shackelford et al. | 210/198.2 |
| 4,966,696 | 10/1990 | Allington et al. | 210/198.2 |
| 5,133,859 | 7/1992 | Frank et al. | 210/198.2 |
| 5,147,538 | 9/1992 | Wright et al. | 210/198.2 |
| 5,160,624 | 11/1992 | Clay et al. | 210/634 |
| 5,173,188 | 12/1992 | Winter et al. | 210/634 |
| 5,193,703 | 3/1993 | Staats et al. | 222/203 |
| 5,198,197 | 3/1993 | Clay et al. | 210/634 |
| 5,250,195 | 10/1993 | Winter et al. | 210/634 |
| 5,268,102 | 12/1993 | Clay et al. | 210/634 |
| 5,268,103 | 12/1993 | Jameson et al. | 210/634 |
| 5,324,427 | 6/1994 | Traveset-Masanes et al. | 210/198.2 |
| 5,342,515 | 8/1994 | Radmacher | 210/198.2 |

FOREIGN PATENT DOCUMENTS 8902712  12/1990  Brazil .

*Primary Examiner*—Joseph W. Drodge
*Attorney, Agent, or Firm*—Vincent L. Carney

[57] ABSTRACT

A preparatory supercritical extraction cartridge includes a chamber for sample having a volume in the range of 20 cubic centimeters to 2,000 cubic centimeters. An inlet and an outlet are fastened to the cartridge walls by threads and sealed to said cartridge walls with spring loaded seals so that they can be removed with a torque requirement of less than 35 pound inches. Inlet and outlet tubing are fastened to the inlet and outlet by quick release connectors.

17 Claims, 3 Drawing Sheets

PREPARATORY SUPERCRITICAL FLUID EXTRACTION USING SEALED CHAMBER

This application is a continuation of application Ser. No. 08/182,772, filed Jan. 18, 1994, now abandoned.

BACKGROUND OF THE INVENTION

This invention relates to supercritical fluid extraction.

One class of supercritical fluid extractor utilizes a cartridge with a substantial capacity in an inner chamber for sample. The ends of the cartridge are closed with end caps that are threaded onto a cartridge barrel. At the top of the cartridge there is an inlet and tubing to permit the flow of supercritical fluid into the inner chamber for extraction of the sample, and at the bottom, there is an outlet and tubing for removing the extract. When the sample is in place and the caps threaded onto the barrel, the cartridge may be heated such as in an oven or the like and supercritical fluid may flow through the cap by appropriate connections and extract may flow through the outlet for collection.

The prior art supercritical fluid extractors in this class have end caps that are tightened with considerable torque to provide a fluid tight connection. Because of the tightness of the end caps, a wrench or other appliance is used to open and close the cartridge.

The prior art supercritical extractors of this invention have a disadvantage in that it is difficult to remove the cap. The difficulty occurs both because it is tightly screwed on and because it is hot when it is opened after an extraction.

SUMMARY OF THE INVENTION

Accordingly, it is an object of the invention to provide a novel supercritical fluid extractor.

It is a further object of the invention to provide a novel preparatory supercritical fluid extractor.

It is a still further object of the invention to provide a supercritical fluid extractor which is relatively easy and simple to handle.

It is a still further object of the invention to provide a method and supercritical fluid extractor capable of being easily opened after an extraction operation.

It is a still further object of the invention to provide a supercritical fluid extraction in which the sample is supported by at least one porous member that may be connected to the extractor before caps are fastened to the pressure chamber or cartridge of the extractor.

In accordance with the above and other objects of the invention, a cartridge for a supercritical extractor has internal walls forming a compartment capable of holding substantial sample. The internal volume of the chamber is in the range of 20 to 2,000 cubic centimeters in volume. It has an inlet adapted to receive supercritical fluid and an outlet adapted to remove the extract. At least one porous support may be fastened in place within the extractor to support sample before the extractor is sealed.

There is at least one removable end cap on a cartridge adapted to hold either the inlet or the outlet or both inlet and outlet, but preferably the inlet. The cartridge and end cap are held together in a manner that permits quick release such as by someone wearing oven mittens rather than requiring a wrench. Nonetheless, a sufficient seal is formed between the end caps.

In the preferred embodiment, there is both an inlet end cap on one side of the cartridge and an outlet end cap on the other side of the cartridge. Quick release fasteners are adapted to connect inlet tubing to the inlet and outlet tubing to the outlet and the end caps are fastened to the cartridge barrel by internal threads on the end caps and external threads on the cartridge to seal the cartridge at both ends. However, the cartridge does not rely on being tightened with high torque to form a fluid-tight seal under pressure as is customary but instead a special seal which is spring energized provides an adequate seal without excessive tightening of the caps. With this cartridge, the cap and cartridge may be separated by unthreading using torque of less than 35 inch pounds.

In use, the cartridge has a substantial amount of sample inserted into it and the end caps are threaded in place. They cooperate with spring energized seals to provide adequate sealing with low torque. The inlet and outlet tubing are connected with quick disconnects to the end caps although, because the tubing is sufficiently long and flexible in some embodiments, the tubing may be connected before the end caps are threaded in place.

Supercritical fluid is caused to flow through the cartridge and the extract is collected. The extraction operation is performed within an oven and usually there is a heat exchanger to maintain the supercritical fluid at its supercritical temperature. After separation, the cartridge may be opened by an operator by hand by gripping the end cap and cartridge barrel and turning them with respect to each other so as to unthread them. The only protection necessary for this operation is mittens because of the low torque necessary to unthread the end caps from the cartridge.

From the above description, it can be understood that the preparatory cartridge of this invention has several advantages, such as for example: (1) it is simple and inexpensive; and (2) it may be opened and closed by hand without the use of wrenches even when it is hot.

SUMMARY OF THE DRAWINGS

The above noted and other features of the invention will be better understood from the following detailed description when considered with reference to the accompanying drawings, in which.

DETAILED DESCRIPTION

Figure 1:
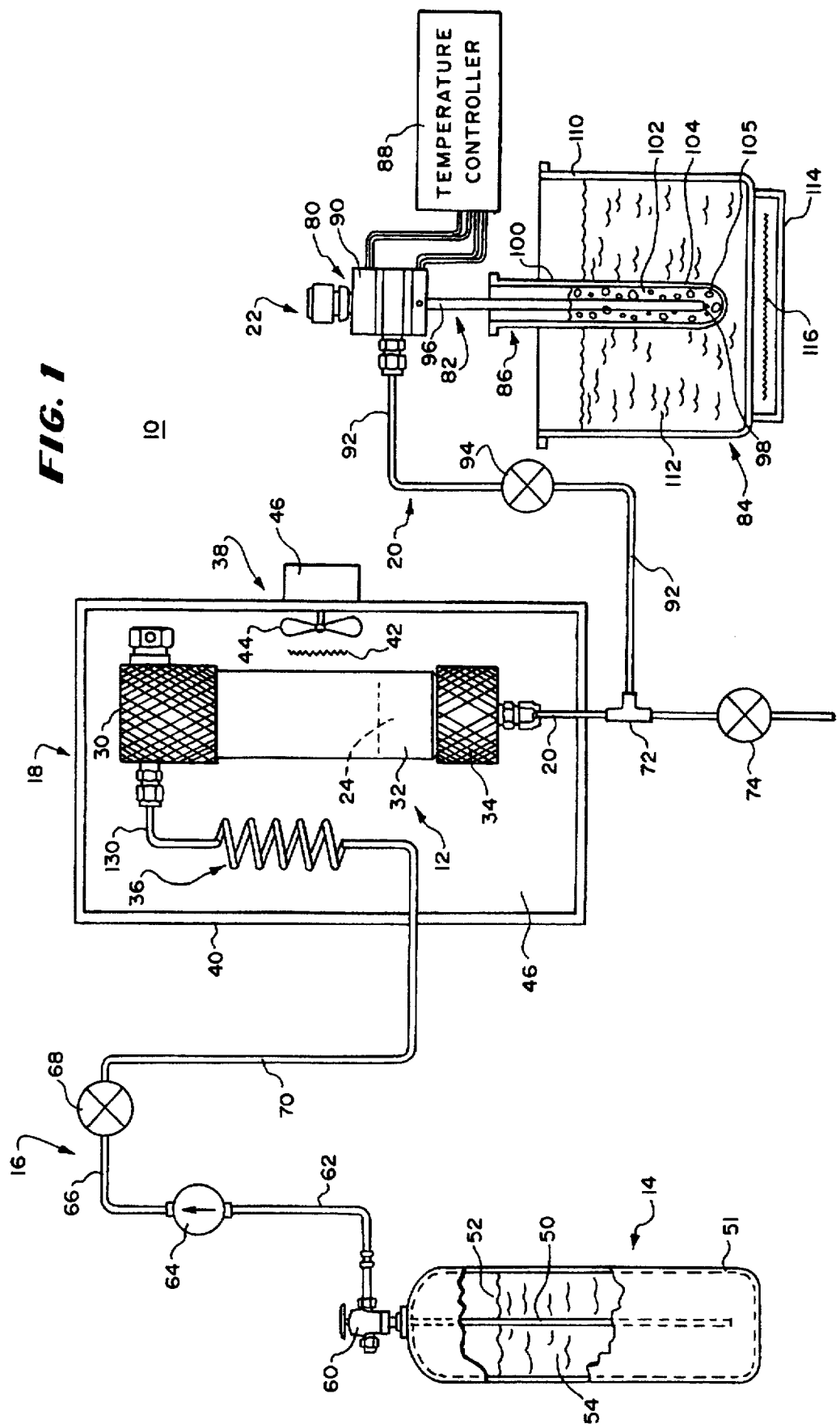
FIG. 1 is a schematic diagram of a supercritical extraction system utilizing an embodiment of the invention.

In FIG. 1, there is shown a schematic diagram of a supercritical fluid extraction system 10 having as its principal parts a cartridge 12, a compressed carbon dioxide cylinder 14, tubing 16 that connects the compressed carbon dioxide cylinder 14 and the cartridge 12, a forced air oven 18, a collection system 22 and tubing 20 connecting the cartridge 12 and collection system 22. A sample 24 may be located within the cartridge 12 for extraction.

To supply supercritical fluid to the extraction cartridge 12, the carbon dioxide cylinder 14 is connected by tubing 16, suitable valves 60 and 68 and a pump 64 to the cartridge 12 within the forced air oven 18. A heat exchanger may also be within the oven to maintain the carbon dioxide at its supercritical temperature. The supercritical fluid is connected to an inlet of the cartridge and the outlet of the cartridge is connected through other tubing 20 to the collection system 22 in which the extract is collected.

The cartridge 12 includes an inlet end cap assembly 30, a cartridge barrel 32, and an outlet end cap assembly 34, with the inlet end cap assembly 30 communicating with an inlet heat exchanger 36 within the forced air oven 18.

With this arrangement, the barrel 32, the inlet cap 30 and the outlet end cap 34 can be threaded together to form an enclosure without tightening them excessively. Accordingly, they can be easily and quickly removed from the oven by a user using only oven mittens for protection and without the need for a wrench.

To maintain the temperature of the heat exchanger 36 and the cartridge 12 during an extraction process, the forced air oven 18 includes a temperature control system 38 and an enclosure formed of walls 40. The heat exchanger 36 and the cartridge 12 are within the walls 40.

To control the temperature, the forced air oven temperature control system 38 includes a thermostatically controlled heater 42, an air circulation fan 44 and a fan motor 46, with the heater 42 being positioned in the path of air driven by the fan 44 within the enclosure of the forced air oven 18. A fan motor 46 drives the fan 44 so that the temperature may be maintained uniform within the enclosure of the forced air oven 18. The rapid circulation of heated air within the air space 48 within the oven enclosure 18 creates uniform heat exchange so that the temperature between the heat exchanger 36 and the cartridge 12 is relatively constant to maintain the carbon dioxide at its supercritical value.

Of course, different temperatures may be set and different fluids used for extraction, with the temperatures being set to maintain the fluids at their supercritical point in a manner known in the art. Similarly, the temperature may be controlled by other mechanisms other than forced air if desired.

The compressed carbon dioxide cylinder 14 includes a dip tube 50, an outer casing 51 and a valve 60. The dip tube 50 extends downwardly within the outer casing 51 from the valve 60 into fluid carbon dioxide 54 which extends upward to the surface 52. With this arrangement, the valve 60 controls the flow of pressurized carbon dioxide upwardly through the tubing 16, inlet heat exchanger 36 and into the cartridge 12.

The tubing 16 includes a first supply tube 62, a pump 64, a second supply tube 66, an extraction valve 68 and a third supply tube 70 communicating with each other in the order named from the cylinder valve 60 to the inlet heat exchanger 36. The pump 64 may be any suitable pump but is preferably a pump manufactured by Isco, Inc., 4700 Superior Street, Lincoln, Nebr. 68505-0347 and sold under the designation "System C260" continuous flow dual syringe pump. With this arrangement, carbon dioxide may be pumped from the cylinder 14 through the pump 64, and when extraction is being performed, through the opened extraction valve 68 and heat exchanger 36 into the cartridge 12 for extracting the sample 24. The valve 68 may be closed to terminate the extraction process.

The tubing 20 includes a T-joint 72, a first arm of which is in communication with the cartridge 12 through the outlet port 34 of the cartridge 12, a second arm of which communicates with a valve 74 and from there to a waste reservoir or other waste conduit to permit removal of waste fluids or the like and a third arm of which is connected through an inlet conduit path 92 to the collection system 22 to permit collecting of extract.

To collect extract, the collection system 22 includes a variable restrictor 80, a probe 82, a temperature controlled bath 84 and a collection tube assembly 86. The collection system 22 is more completely described in U.S. patent application 08/134,033 filed Oct. 12, 1993, now abandoned, for APPARATUS AND METHOD FOR SUPERCRITICAL FLUID EXTRACTION by Jameson, Macomber and Allington, assigned to the same assignee as this application.

Generally, the variable restrictor 80 communicates with the probe 82 and controls the temperature at the inlet end. The probe 82 extends into the collecting fluid 102 within the collection tube 100, the temperature of which is controlled by the temperature controlled bath 84 in which the collection tube 100 is immersed.

The variable restrictor 80 includes a valve body 90 and the inlet conduit path 92. It is also connected to the temperature controller 88 to control the temperature of the effluent flowing from the inlet conduit path 92 into the probe 82.

The probe 82 communicates with the effluent tube 92 through the valve body 90. Its temperature is controlled to maintain the extract fluid under the control of the temperature controller 88 by a Joule heater or the like. It is an elongated tube that extends downwardly into the collection liquid 102 within the collection tube 100 and includes a metering valve 98 at its lower point underneath the collection liquid within the tube.

With this arrangement, analyte passes through the analyte valve 94, is controlled in temperature within the metering valve 98 by the temperature controller 88 and flows downwardly through the probe 82 and through the metering valve 98 adjusted for efficient collecting within the collection tube 100.

The collection tube 100 is filled with the collection liquid 102 within walls 104 and the entire tube is immersed in temperature controlled water 112 to control the temperature of the collecting fluid 102 within the tube 86 with respect to the temperature of the extract and the fluid carrying it. The temperature is controlled at a value that reduces the escape of sample with gaseous carbon dioxide and condensation of the extract on the probe walls. The probe body 96 communicates at one end with the valve body 90 and at the other end with the metering valve 98.

The collection tube 100 includes tube walls 104 capable of holding the collection fluid 102 and receiving the probe body 96 extending near the bottom. By controlling the temperature of the extract and the size of the opening of the metering valve 98, the sample is collectable outside of the probe body 96 but a minimum amount escapes with the carbon dioxide or other solvent material together with the bubbles such as those shown at 105.

The temperature controlled bath 84 includes a wall 110, the heat transfer fluid 112, a heater housing 114, and a heating or cooling element 116. The heating or cooling element 116 is adjacent to the walls 110 to transfer heat or draw heat from the heat transfer fluid 112 in the temperature controlled bath 84. The collection tube 100 is partly within this bath to control the temperature of the collection liquid 102 during an extraction operation.

Figure 2:
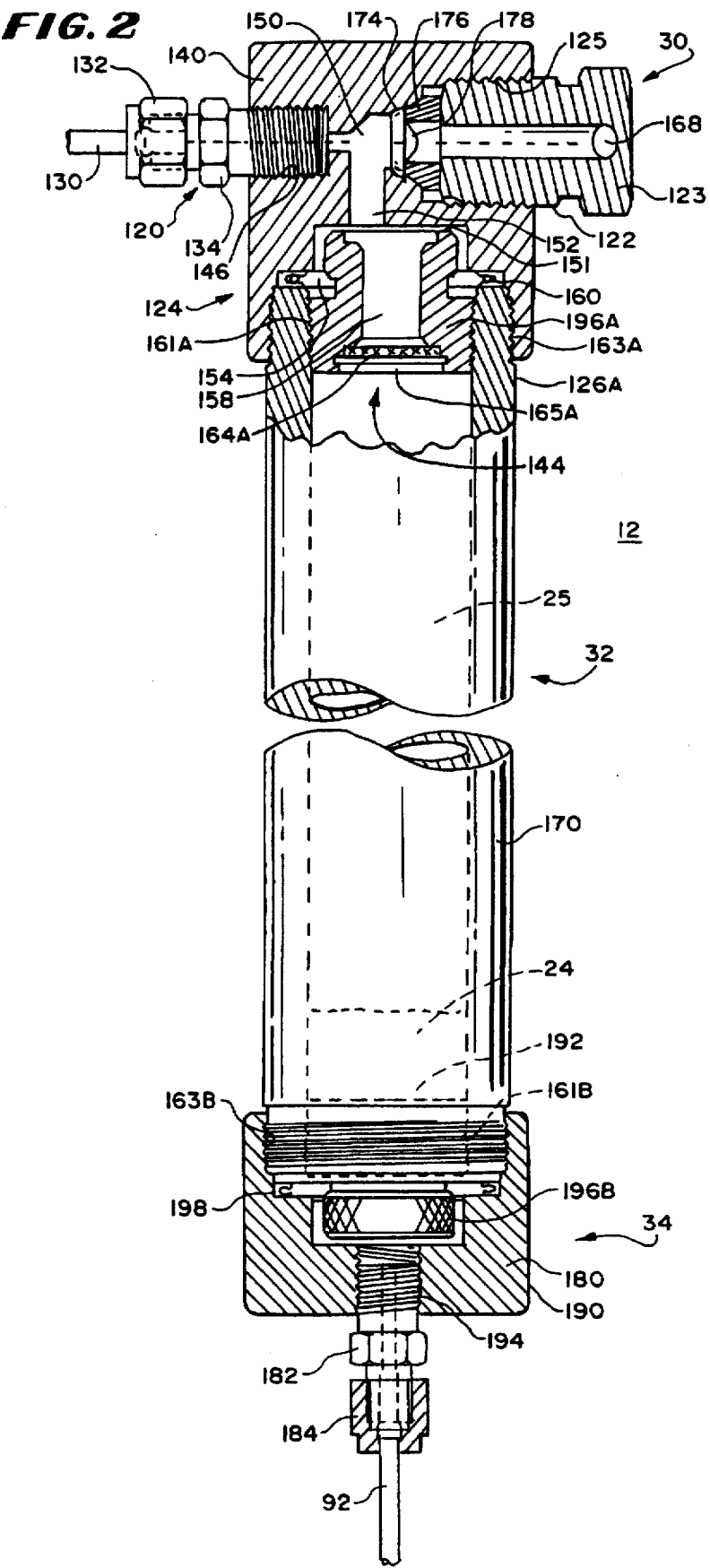
FIG. 2 is an elevational fragmentary view, partly broken away, showing a preparatory cartridge in accordance with an embodiment of the invention.

In FIG. 2, there is shown a sectional view, partly broken away, of the cartridge 12 having an inlet end cap assembly 30, a cartridge barrel 32 and an outlet end cap assembly 34. The inlet end cap assembly 30 is adapted to receive tubing 130 carrying the extract and communicates with the top of the cartridge to apply the analyte to the barrel 32. The sample 24 is within the barrel 32 and the extract flows through it and into the outlet end cap assembly 34 which communicates with the sample collector 22 (FIG. 1). In the preferred embodiment, the cartridge 12 has a capacity of 100 cubic centimeters but should have a capacity of between 20 and 2,000 cubic centimeters.

The inlet end cap 30 includes an inlet connector 120, an overpressure nut assembly 122, an end cap body assembly 124, and a frit holder assembly 196A. The inlet connector 120 is adapted to receive supercritical fluid through the inlet tubing 130, to supply the fluid into the barrel 32 of the extractor through the frit holder assembly 196A separately threaded therein and to supply pressure to the overpressure nut assembly. The overpressure nut assembly protects the cartridge by venting off any excessive internal pressure. The end cap body assembly 124 includes passageways connecting the inlet to the overpressure assembly and to the interior of the cartridge barrel 32 through porous openings in the frit holder 196A.

The inlet connector 120 includes inlet tubing 130, an inlet ferrule nut and inlet ferrule 132 and an inlet tubing adaptor 134. The tubing 130 is connected to passageways within the end cap body assembly 124 by the adaptor and held releaseably in place by the inlet ferrule nut and the ferrule 132 to permit easy connecting and disconnecting of the cartridge 12 from the tubing. One suitable type of fingertip connector is sold under the trademark, KEYSTONE SLIP-FREE CONNECTORS, by Keystone Scientific, Inc., Penn Eagle Industrial Park, 320 Rolling Ridge Drive, Bellefonte, Pa. 16823-8812.

It is important to be able to turn the end cap, and unscrew it quickly and easily to permit easy opening of the cartridge by a person simply using oven mittens rather than needing to use a tool such as wrenches or the like. To permit ease in unscrewing the cap from the cartridge barrel, either a finger-tight or quick connect and disconnect for tubing is provided in the preferred embodiment or the tubing must be long enough and flexible enough to permit unscrewing of the cap without disconnecting the tubing from the cap. The two end caps 30 and 34 are threaded onto cartridge barrel 32 so that the cartridge barrel can be unscrewed from each of end cap by rotating the barrel while holding the end caps stationary. This tubing is sufficiently long to permit at least four turns of said at least one end cap without removing it.

To receive the inlet connector 120 and the overpressure nut assembly 122, the end cap body assembly 124 includes a generally solid body portion 140, an internally threaded inlet recess having threads 161A, inlet frit holder recess 144, and an inlet seal. The external threads 163A and 163B on respective ends of the cartridge barrel 32 are generally parallel to internal threads 161A and 161B respectively, that engage corresponding internal threads on the frit holder assemblies 196A and 196B. The external threads are adapted to engage internally threaded cylindrical members of the body portion 140 of the end cap assembly which seals the cartridge and inner threads are adapted to engage the frit holder assembly 196A and a similar frit holder 196B on the opposite end of the barrel 32 which isolate the sample within the cartridge.

The outlet frit holder recess 144 is adapted to hold the frit holder assembly that provides filtered supercritical fluid to the interior of the cartridge, the internally threaded inlet recess 146 is adapted to receive the inlet connector 120, the overpressure nut internally threaded recess 125 is adapted to receive the overpressure nut assembly 122 and passageways within the body of the end cap distribute fluid and fluid pressure to the overpressure nut assembly and frit holder. Within the body portion of the end cap body 140 and frit holder assembly 196A are passageway 150, 152 and 158. The passageway 150 communicates with the overpressure nut assembly 122 and with a transversely oriented cylindrical passageway 152. The passageway 152 communicates through another transverse passageway with an annular pressure sealing passageway 154 and with an outlet passageway 158. The outlet passageway 158 communicates with the outlet recess 144 through the frit 162A.

The annular pressure sealing passageway 154 receives an annular inlet seal 160 which rests within the recess between a shoulder of the end cap 30 and a cylindrical wall of the cartridge barrel 32 to form a seal when the two are threaded together by complimentary internal threads on the annular pressure sealing passageway 154 and external threads on the cylindrical wall of the cartridge barrel 32 so that internal pressure applied to the seal from the annular passageway 154 together with the spring loading of the seal 160 provides a pressure-tight seal against the pressurized supercritical fluid within the cartridge.

At the end of the outlet recess 144 and externally threaded outlet frit holder 196A, there is an annular flat inlet retaining ring 164A which rests on a shoulder therein and supports a disk-shaped inlet frit 162A that covers the passageway 158 and rests within conical-frustum shaped opening with the small end communicating with the passageway 158 and the large end corresponding in area with that of the inlet frit disk 162A. The inlet frit disk 162A is held within an inlet frit holder by snap ring 164A, a similar arrangement holds an outlet frit disk (not shown) in holder 196B in the outlet end cap 34.

To prevent excessive pressure, the overpressure nut assembly 122 includes an overpressure port 168, a tapering portion of the overpressure relief in the passageway 150 that engages a cylindrical portion of an overpressure backing ring 176 leading to the overpressure rupture disk 178. The pressurized side of the disk lies within cylindrical recess 174 in the inlet cap body 140.

With this arrangement, the inlet end cap assembly 30 may be fastened to the external wall 170 of the cartridge barrel 32, separately receiving externally threaded portions of the frit holder assembly 196A within internally threaded end portions of the wall 170 within the recess 144 and receiving the end cap body on externally threaded portions of the wall 170, which body and frit holder assembly are threaded with approximately four consecutive threads on each side.

The body portion compresses within the passageway 154 the spring loaded Bal seal 160 to seal the outlet passageways 158 and 144 within the internal chamber of the cartridge so that supercritical fluid from the tubing 130 flows against the overpressure rupture disk 168 and downwardly through the passageway 158 and the frit 162 into the interior of the cartridge. The same fluid pressurizes the Bal seal. The threads have an appropriate design to close the end cap to the barrel with less than 10 complete turns and more than one-half revolution in a manner known in the art.

While there are many seals suitable as a sealing mechanism, in the preferred embodiment, the seal 160 is a Bal seal sold by Bal Seal Engineering Company Inc., 620 West Warner Avenue, Santa Ana, Calif. 92707-3398 and described in U.S. Pat. Nos. 4,655,462; 4,678,210; 4,804,290; 4,805,943; 4,826,144; 4,830,344; 4,876,781; 4,890,937; 4,893,795; 4,906,109; 4,907,788; 4,915,368; 4,934,556; 4,961,253; 4,964,204; 4,974,821; 5,072,070; 5,108,078; 5,117,066.

The cartridge barrel 32 includes the cylindrical wall 170 described above with: (1) external threads at each end for cooperating with internal threads on different ones of the end cap bodies 140 and 180; and (2) internal threads cooperating with external threads on different ones of the frit holder assemblies 196A and 196B. The outlet end cap assembly 34 includes an end cap body assembly 180, an outlet tubing adaptor 182, an outlet ferrule nut and ferrule 184 and the outlet tubing 92. The outlet tubing adaptor 182, the outlet ferrule nut and ferrule 184 and the outlet tubing 92 are substantially the same as the inlet tubing adapter 134, the inlet ferrule and inlet ferrule nut 132 and inlet tubing 130.

The end cap body assembly 34 includes a body portion 180, an internally threaded cylindrical inlet recess 192, an internally threaded outlet recess 194, an outlet frit holder assembly 196B which holds an outlet frit (not shown) in the recess 192 in the same manner as inlet frit holder 196A assembly holds inlet frit 162A, and an outlet seal 198. The outlet seal 198 is used in the same manner and is the same type of seal as the seal 160 in the inlet end cap assembly 30.

With this arrangement, extractant and supercritical fluid carrying the extractant flow from the inside of the cartridge 32 through the frit holder assembly 196B and the frit therein and downwardly through the outlet tube 92 through the wall 190 of the body 180. The seal 198 communicates with the outlet to receive pressure and form a tight seal without causing the need for excessive torque in removing the barrel.

Inlet frit holder assembly 196A and outlet frit holder assembly 196B loosely screw into upper and lower internal threads 161A and 161B of the cartridge barrel 32. There is no seal between the frit holders 196A, 196B and the barrel 32 other than the labyrinth seal provided by the threads 161A and 161B. A tight seal is not required because the pressure at the top end of each frit holder is substantially equal to the pressure at the bottom end of the frit holder (FIG. 2).

The frit holders captivate and isolate sample in the base 24 of barrel 32 but do not provide a seal. The end caps 30 and 34 provide a high pressure seal but do not captivate the sample. Sample particles can not reach and spoil the seals 160 and 198 because they are blocked by inlet frit 162 in holder 196A and a corresponding outlet frit (not shown) in holder 196B.

Separating the functions of sealing and sample containment make it possible to insert and replace sample in the cartridge 12 without the need to exceed the torque or force available using only oven mittens to grasp the barrel 32, end caps 30, 34 or frit holders 196A, 196B. Inlet frit holder 196A with inlet frit 162 and outlet frit holder 196B with its outlet frit (not shown) constitute separate and separable isolating means that keep solid sample 24 isolated within bore 25 and provide for the flow of supercritical extracting fluid through the sample.

In operation, the sample 24 is deposited within the cartridge 12 by unscrewing the top. To unscrew the top, the inlet connector 120 is removed and the top unscrewed and removed. Then the frit holder 196A is unscrewed and removed. Sample is inserted into the cartridge and the top frit holder and top cap screwed back on. This captivates the sample between the frit in the outlet frit holder 194B and the inlet frit holder 194A. The tubing may then be connected to the inlet.

To perform extraction, the carbon dioxide cylinder 14 (FIG. 1) is connected by the valve 60 (FIG. 1), the first supply tube 62 (FIG. 1), the pump 64 (FIG. 1) and the second supply tube 66 (FIG. 1), to the extraction 68 (FIG. 1). The outlet of the valve 68 is connected through third supply tube 70 through the heat exchanger 36 (FIG. 1) and from there through tubing 130 to the cartridge 12. The extraction valve 68 (FIG. 1) may be opened and the pump 64 (FIG. 1) caused to pump extractant through the sample 24 and through the inlet conduit path 92, analyte valve 94, inlet conduit path 92 into the variable restrictor housing 80. From there, it flows through the probe 82 and is collected at the collecting liquid 102. After the extractant has flowed into the collecting liquid 102, the valve 74 may be opened to cause further fluid to flow to a reservoir.

To remove the cartridge, after extraction, the operator may, with oven mittens on his or her hands, simply and quickly unscrew the cartridge. Approximately four turns are typical for that purpose. Generally, the amount of torque applied by someone gripping the cartridge and the cap will be less than 30 inch pounds and preferably within the range of one half to 30 inch pounds.

Figure 3:
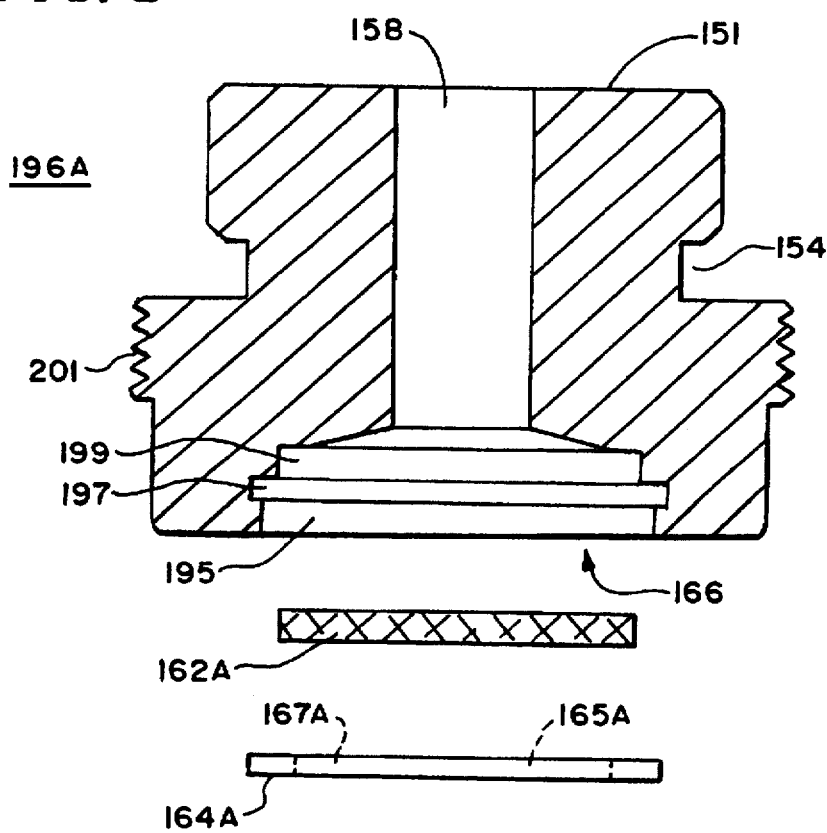
FIG. 3 is a sectional view, partly exploded, showing a portion of the end cap with a frit holder useful in the cartridge of the embodiment of FIG. 2.

In FIG. 3, there is shown a sectional view of the frit holder assembly 196A for holding a frit 162A and a compressible C-shaped retaining ring 164A in place within the inlet end cap 30 (FIG. 2). As shown in this view, the central passageway 158 communicates with the surface 151 spaced from the wall of the body 140 to communicate with the cyclindrical passageway 152 and to form the annular pressure sealing passageway 154. These openings cooperate with the upper inlet end cap to form a sealing passageway. This unit is held in place by the external threads which cooperate with internal threads in the inlet end cap and has machined into it opening 166 having a cylindrical portion 199 with a beveled surface between the central passageway 158 and the frit disk 162A.

The retaining ring 164A fits in a shoulder 197 and is sufficiently compressible to be placed therein for that purpose so that the passageway 158 communicates with an outlet 195 through the frit 162A and the interior open portion 165A of the retaining ring 164A. The retaining ring 164A includes an opening 167A to permit compression. The frit holding assembly 196B in the outlet end cap is arranged in the inverse order as is the inlet cap frit holder shown in FIG. 3.

Figure 4:
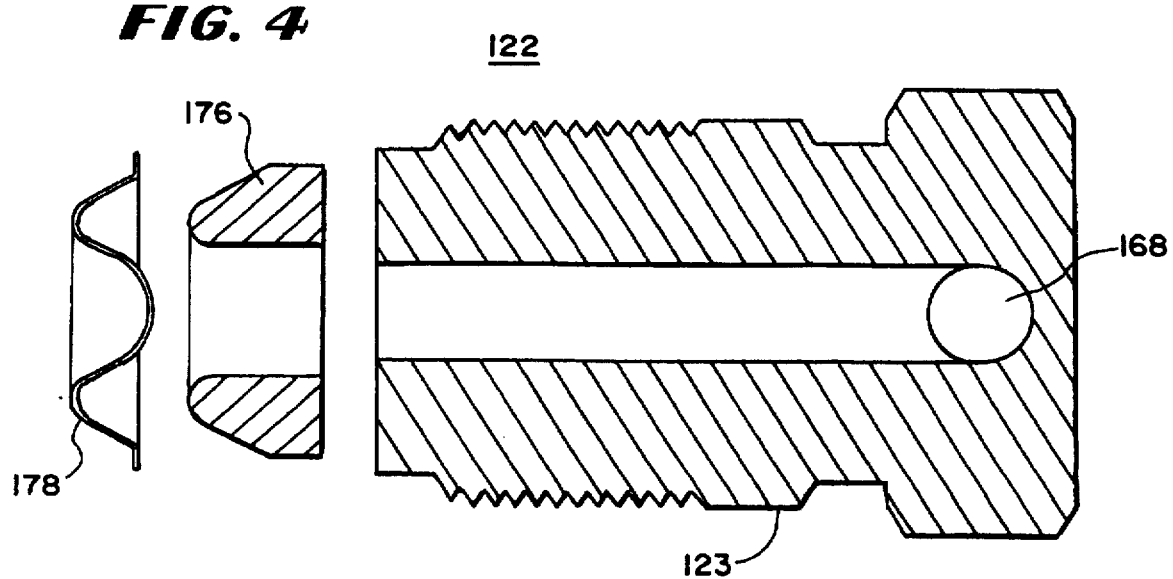
FIG. 4 is an enlarged sectional view of an overpressure nut used in an end cap in accordance with the embodiment of cartridge of FIG. 2.

In FIG. 4 there is shown an enlarged sectional view of the overpressure nut assembly 122 having a nut body portion 123, the overpressure port 168, the overpressure rupture disk 178 and the overpressure backing ring 176. As shown in this view, the rupture disk 174 is adapted to be held in place by the ring 176 and to rupture when a predetermined pressure is exceeded, thus permitting escape of pressurized supercritical extraction fluid through the port 168. This assembly is threaded in place by external threads within the inlet end cap 30 (FIG. 2).

In operation, the sample 24 (FIGS. 1 and 2) is inserted into the cartridge 12 after the outlet end cap assembly 34 is threaded onto the barrel portion 32. The inlet end cap assembly 30 is then threaded in place. The quick connect on the tubing 130 is then inserted and sealed and the extraction valve 68 opened, the pump 64 started and the valve 60 opened so that carbon dioxide flows through the tubing 62, 66 and 70, the heat exchanger 36 and into the cartridge 12. The oven 18 is heated by the heating element 42 and the heat is evenly distributed by the fan 44 to maintain the temperature at the supercritical point.

During the extraction, the valve 74 is closed to prevent discharge of extractant and the supercritical fluid and extractant flows through the T joint 72, the inlet conduit portion 92, the analyte valve 94 and into the variable restrictor 80 of the collection system 22, where it flows downwardly through the probe 82 into the collecting fluid 102 within the collecting tube 100. The temperature of the bath in which the tube 100 is immersed is controlled by the heating element 116 so that, generally, the collecting fluid 102 is at a temperature lower than the extractant and supercooled fluid which are maintained by the temperature control 88 at a supercontrolled temperature.

After the extraction is completed, the quick disconnect fasteners at the inlet and outlet ends of the cartridge are removed and then the inlet cap may be unthreaded by the user grabbing the barrel 32 with a hand protected only by an oven mitt and unthreading the cap 32 with the other hand protected only by an oven mitt. The tube releases with a torque applied by hand of less than 35 inch pounds, well within the range of a person of average strength without the need of wrenches or other attachments.

From the above description, it can be understood that the extractor of this invention has several advantages, such as for example: (1) it is relatively inexpensive; (2) it is convenient to use; and (3) large amounts of material can be extracted quickly and the cartridge removed from the inlet caps expediently using only mitted gloves as protection for the hands of the operator.

Although a preferred embodiment of the invention has been described with some particularity, many modifications and variations in the preferred embodiment are possible without deviating from the invention. Accordingly, within the scope of the appended claims, the invention may be practiced other than as specifically described.

What is claimed is:

1. Apparatus for preparatory super-critical fluid extraction of solid contents within a cartridge, comprising:
    walls defining a cartridge having a central chamber containing sample to be extracted;
    said chamber having a volume of in the range of 20 cubic centimeters to 2,000 cubic centimeters;
    inlet means for permitting supercritical fluid to enter said chamber;
    outlet means for permitting extractant to be removed from said chamber;
    at least one end cap mounted for fastening to said cartridge walls;
    said at least one end cap including one of said inlet means and outlet means; and
    isolating means between the at least one end cap and the chamber for preventing solid contents from reaching said at least one end cap;
    said isolating means incorporating fluid permeable means conveying fluid between the at least one end cap and the chamber;
    said isolating means being removable from the cartridge without the use of a tool;
    a seal;
    fastener means for fastening said at least one end cap to said cartridge walls for sealing said at least one end cap to said cartridge walls with a torque requirement for separating the two of less than 35 pound inches, and
    said fastener means including a first path from said one of the inlet means and outlet means through said isolating means into the central chamber and a second path from said one of the inlet means and outlet means to said seal, wherein said seal is pressurized whereby said at least one end cap is sealed without tightening with a tool while said central chamber is pressurized.

2. A cartridge in accordance with claim 1 in which said fastening means includes complimentary screw threads on said cartridge and said at least one end cap.

3. A cartridge in accordance with claim 1 further including a second seal, the second seal being a spring loaded seal adapted to seal said at least one end cap against the cartridge walls.

4. A cartridge in accordance with claim 3 further including:
    a second end cap, one of said at least one end caps being an inlet end cap and the other of said at least one end cap being an outlet end cap;
    said inlet means being part of said inlet end cap and said outlet means being part of said outlet end cap.

5. A cartridge in accordance with claim 1 further including quick release connectors for connecting tubing to the inlet means and the outlet means.

6. A cartridge in accordance with claim 1 comprising inlet connecting tubing wherein the inlet connecting tubing is sufficiently long to permit at least four 360 degree turns of said at least one end cap without end cap removals from said inlet connector tubing.

7. A cartridge in accordance with claim 1 in which said fluid permeable means includes at least one frit.

8. A method of preparatory supercritical extraction, comprising the steps of:
    inserting sample into a cartridge having a central chamber for containing sample to be extracted, wherein said chamber has a volume in the range of 20 cubic centimeters to 2,000 cubic centimeters;
    forcing supercritical fluid to enter said chamber through a first path from an inlet means, wherein the inlet means is within an end cap removably mounted to a cartridge barrel by fastener means;
    forcing supercritical fluid against a seal for said chamber through a separate second path from said inlet means wherein said chamber is sealed from the outside;
    permitting extract to be removed from said chamber through an outlet means;
    removing the fastener means from said cartridge barrel after extraction by hand by applying a torque for separating the two of less than 35 pound inches.

9. A method in accordance with claim 8 wherein the step of removing said fastener means includes the step of unscrewing complimentary screw threads on said cartridge and said end cap.

10. A method in accordance with claim 8 further including the step of fastening said end cap to said cartridge barrel with a second seal wherein the second seal is a spring loaded seal between the two, said second seal being adapted to seal the end cap against the cartridge barrel.

11. A method in accordance with claim 8 wherein the step of removing the fastener means includes removing tubing from the inlet means wherein the tubing is mounted to the inlet means by quick release connectors.

12. A method in accordance with claim 8 wherein the step of removing the fastener means includes the step of unscrewing said end cap while inlet connecting tubing remains connected to the end cap and is sufficiently long to permit at least four turns of the end cap without removing the end cap from the inlet connecting tubing.

13. A method of making preparatory supercritical extraction apparatus, comprising the steps of:
    forming a cartridge having a central chamber for containing sample to be extracted, wherein said chamber has a volume in the range of 20 cubic centimeters to 2,000 cubic centimeters;

attaching an end cap having inlet means for supercritical fluid to enter said chamber through one passageway and to apply pressure to a seal through another separate passageway to seal said chamber, wherein the inlet means is mounted to a cartridge barrel by fastener means that permits the removal by hand of the fastener means from said cartridge barrel after extraction by applying a torque for separating the two of less than 35 pound inches; and forming outlet means for extract to be removed from said chamber.

14. A method in accordance with claim 13 further including the step of forming complimentary screw threads on said cartridge and the end cap.

15. A method in accordance with claim 13 further including the step of attaching a second seal, wherein the second seal is a spring loaded seal between the end cap and said cartridge barrel adapted to seal the end cap against the cartridge barrel.

16. A method in accordance with claim 13 further including the step of providing quick release connectors for removing tubing from the inlet means.

17. A method in accordance with claim 13 further including the step of providing tubing connected to said inlet means wherein the tubing is sufficiently long to permit at least four 360 degree turns of the end cap without removing the end cap from the inlet connecting tubing.

* * * * *